US012562896B2

(12) United States Patent
Marsala et al.

(10) Patent No.: US 12,562,896 B2
(45) Date of Patent: Feb. 24, 2026

(54) SYSTEM AND METHOD FOR PROVIDING SECURE COMMUNICATION USING EPHEMERAL KEYS WITH A LIFETIME ASSOCIATED WITH A TYPE OF DATA BEING SECURED

(71) Applicant: Textron Innovations Inc., Providence, RI (US)

(72) Inventors: Lawrence Russell Marsala, Fort Worth, TX (US); Nina Vajda, Dallas, TX (US); Brian North, Chico, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 238 days.

(21) Appl. No.: 18/196,390

(22) Filed: May 11, 2023

(65) Prior Publication Data

US 2024/0380583 A1　Nov. 14, 2024

(51) Int. Cl.
*H04L 9/08*　　　(2006.01)
*H04L 9/32*　　　(2006.01)

(52) U.S. Cl.
CPC .......... *H04L 9/0866* (2013.01); *H04L 9/0825* (2013.01); *H04L 9/3228* (2013.01)

(58) Field of Classification Search
CPC .... H04L 9/0866; H04L 9/0825; H04L 9/3228

USPC ......................................................... 713/171
See application file for complete search history.

(56) References Cited

U.S. PATENT DOCUMENTS

| | | | | |
|---|---|---|---|---|
| 11,650,935 B2 * | 5/2023 | Edgecombe | ............ | G06F 21/64 |
| | | | | 713/155 |
| 2006/0236098 A1 * | 10/2006 | Gantman | ............ | H04L 63/0823 |
| | | | | 713/158 |
| 2009/0169012 A1 * | 7/2009 | Smith | .................... | H04L 9/0836 |
| | | | | 380/277 |
| 2020/0218821 A1 * | 7/2020 | Liu | ...................... | H04L 63/0442 |
| 2021/0150038 A1 * | 5/2021 | Valecha | ................ | H04L 9/3268 |

* cited by examiner

*Primary Examiner* — Moeen Khan
(74) *Attorney, Agent, or Firm* — SLATER MATSIL, LLP

(57) ABSTRACT

A system for providing ephemeral keys for a cryptographic system includes a secure enclave configured to generate one or more ephemeral keys (EKs), where each EK of the one or more EKs has a lifetime associated with the respective EK, and one or more secured devices connected to the secure enclave, where each secured device of the one or more secured devices has a trusted platform module (TPM) configured to acquire at least one of the one or more EKs, where the TPM of each secured device further is configured to generate secured data in response to validating the lifetime of an associated EK by encrypting sensitive data with the associated EK, and where each secured device of the one or more secured devices is further configured to transmit the secured data to an entity external to the secured device.

20 Claims, 7 Drawing Sheets

300

302        304        306        308        310        312

| EK ID Data | Parent ID | Lifetime Data | Key Data | Rules/Data | Security Signature |
| --- | --- | --- | --- | --- | --- |

SYSTEM AND METHOD FOR PROVIDING SECURE COMMUNICATION USING EPHEMERAL KEYS WITH A LIFETIME ASSOCIATED WITH A TYPE OF DATA BEING SECURED

TECHNICAL FIELD

The present invention relates generally to a system and method for providing secure computing systems, and, in particular embodiments, to a system and method for providing secure communications using ephemeral keys with lifetimes associated with a type of data being secured.

BACKGROUND

Generally, cryptography protects data using encryption to protect data. In particular, cryptography may be used to permit communications to be encrypted for transmission across networks of unverifiable trustworthiness. Thus, encrypting transmitted data permits transmission of encrypted data with confidence that any interception of data will be difficult to decrypt to learn the contents.

However, in certain situations where one or both ends of a communications system are not secure, the verifiability of the encryption system needs to be ensured. For example, where a mobile communications system may be accessed by a hostile party, the hostile party accessing a terminal may result in the hostile party being able to access the encryption system and gain, for example, a private key to impersonate a trusted party, or to decrypt data meant for a user of the now compromised terminal.

SUMMARY

An embodiment system includes a secure enclave configured to generate one or more ephemeral keys (EKs), where each EK of the one or more EKs has a lifetime associated with the respective EK, and one or more secured devices connected to the secure enclave, where each secured device of the one or more secured devices has a trusted platform module (TPM) configured to acquire at least one of the one or more EKs, where the TPM of each secured device further is configured to generate secured data in response to validating the lifetime of an associated EK by encrypting sensitive data with the associated EK, and where each secured device of the one or more secured devices is further configured to transmit the secured data to an entity external to the secured device.

An embodiment system includes a processor, and a non-transitory computer readable medium having a program stored thereon for implementing a trusted platform module (TPM). The program includes instructions to acquire, from a secure enclave, at least one ephemeral key (EK) of one or more EKs generated by the secure enclave, where each EK of the one or more EKs has a lifetime associated with the respective EK, generate secured data in response to validating the lifetime of an associated EK by encrypting sensitive data with the associated EK, and transmit the secured data to an entity external to the system.

An embodiment method includes generating one or more ephemeral keys (EKs), wherein each EK of the one or more EKs has a lifetime associated with the respective EK, acquiring, by a trusted platform module (TPM) of a secure device of one or more secured devices, at least one EK of the one or more EKs, generating, by the TPM, secured data in response to validating the lifetime of an associated EK by encrypting sensitive data with the associated EK, and transmitting, by the TPM, the secured data to an entity external to the secured device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1A:
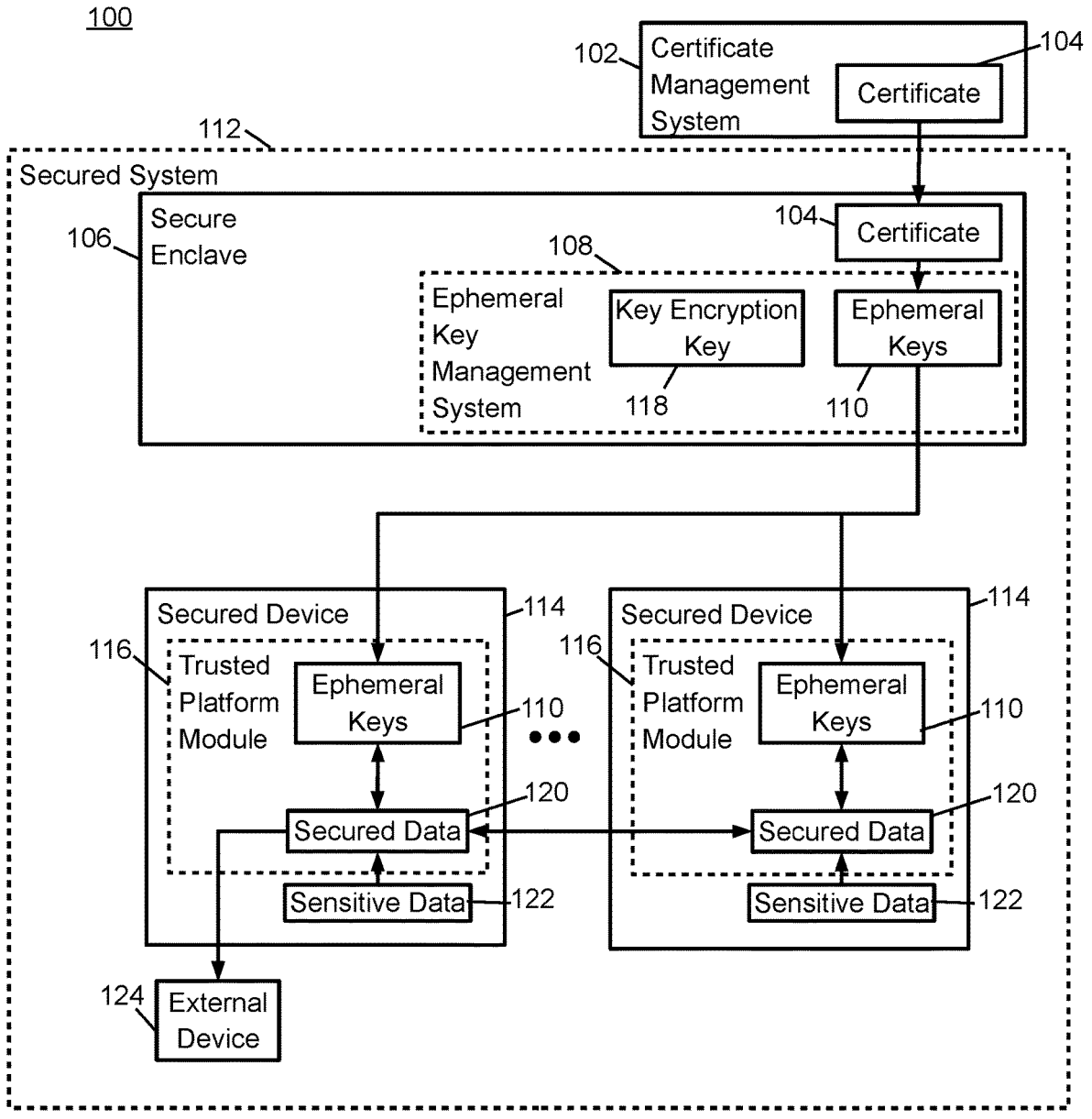
FIGS. 1A and 1B are logical diagrams illustrating systems for implementing ephemeral keys (EKs) according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Many cryptographic systems rely on the security of the transmission endpoints to secure private keys used in cryptographically sealed communications. However, for systems where one or more transmission endpoints are not secure, the private key may be accessed by an adversary that is an unfriendly third party, permitting the adversary to access secured transmissions, and to potentially impersonate the compromised transmission endpoint. Cryptography seeks to provide easily access to encrypted data using keys that are secret to a single party.

For example, in a symmetric key cryptosystem, both transmission endpoints use a shared secret key, or keys that are easily obtainable from each other. Data Encryption Standard (DES) and the Advanced Encryption Standard (AES) are block cipher designs that use symmetric keys or shared secret keys to encrypt data. However, an attacker that accesses a key at one transmission endpoint is able to access to each past and future message using the acquired secret key. Additionally, simply rotating the keys, or changing the keys using a "one time pad" concept still leaves the keys available to an attacker since the keys are stored at the transmission endpoints.

Asymmetric key cryptosystems use a public key and a private key for each endpoint, with the public key and private key being mathematically related. A transmission may be encrypted using a public key for a transmission end point, and then decrypted using the private key held by the transmission endpoint. However, an attacker accessing a transmission endpoint that gains access to a private key may be able to decrypt past and future transmissions to the compromised endpoint. Additionally, public-private key pairs may be used to sign and verify transmissions, with a transmission sent with having a signature based on the sender's private key, and a receiving endpoint able to verify the identity of the sending endpoint by decrypting or verifying the signature using the sending endpoint's public key. An attacker acquiring a private key from a compromised endpoint could then impersonate an endpoint by using the private key to digitally sign transmissions.

Hybrid systems may help avoid the issues raised with symmetric key systems by encrypting a transmission using a private key, and then encrypting the private key using asymmetric key encryption and transmitting the encrypted private key. However, the issue of an attacker gaining access to a private key in an asymmetric system still remains.

In order to provide protection against long-term effects of an attacker accessing a transmission endpoint, ephemeral keys (EKs) may be generated and used for each transmission, transmission portion, packet, or other discrete data entity. The EKs may be used to implement a zero-trust architecture that flows down to handling of the lowest level transactions or data entities. The EKs have an associated lifetime that extends for a tactically relevant time frame, so that an attacker accessing old keys or not having a current key does not compromise the protected systems. Additionally, each EK may be derived from, or tied to a parent entity such as a certificate or parent EK, so that revocation or expiration of the parent entity invalidates all child EKs.

FIG. 1A is a logical diagram illustrating a system 100 for implementing EKs 110 according to some embodiments. The system 100 may have a certificate management system 102 that generates a certificate 104. The certificate 104 may be a data set or similar data construct that from which one or more EKs 110 are derived. In some embodiments, the certificate 104 includes rules for derived EKs 110 and derived EK lifetimes. For example, the rules may define lifetimes for EKs 110 of different data types, with the lifetimes being tactically relevant time frames for the type of data being protected or the criticality of data. In some embodiments, related certificates may be distributed across multiple secured systems 112 to create a data centric network across distributed protected systems 112.

The certificate 104 is transferred to a secured system 112 and may be associated with, for example, a mission or other job to which the secured system 112 is assigned. The secured system 112 may be any system that handles sensitive data and uses internal or external transmissions to handle the sensitive data. In some embodiments, each secured system 112 may be, for example, an aircraft such as a rotorcraft, tilt-rotor craft, fixed wing aircraft, or the like, a ground vehicle such as an armored vehicle, a transport, a heavy machinery, or the like, or a waterborne vehicle such as a ship, patrol boat, or the like. Additionally, the vehicle does not necessarily need to be a conveyance used for transporting or capable of carrying people, as the secured system may be a portable secured system such as a radio system, data system, calculation system, or the like.

The certificate 104 may have a lifetime that is defined by a rule in the certificate 104. In some embodiments, the certificate 104 is loaded into a secure enclave 106 or other secure computing or storage system. The secure enclave 106 may be implemented in hardware as a secure hardware portion of a processor, system-on-a-chip (SoC), field programmable gate array (FPGA), or other processing circuit.

In some embodiments where the secure enclave 106 is implemented as a secure portion of a processor, the secure enclave 106 may be a sequestered portion of memory and may access or use an associated secured portion of a processor. In some embodiments, the secure enclave 106 itself is temporal, and may generate EKs 110, and may go offline after generating the EKs 110. The secure enclave 106 may have an ephemeral key management system (EKMS) 108 in which one or more ephemeral keys (EKs) 110 are generated, stored or otherwise handled. The EKMS 108 may also track the lifetimes of EKs 110 to avoid an EK 110 being impersonated using improperly generated lifetime data. In some embodiments, the EKMS 108 may further track the lifetime and validity of other EKs 110 to permit verification that each EK 110 descends or depends from valid parent EKs 110.

In some embodiments, the secured system 112 has one or more secured devices 114 that have a respective trusted platform module (TPM) 116. While the secured system 112 is illustrated with a limited number of secured devices 114, the secured system 112 is not limited to any particular number of secured devices 114. The secured devices 114 may be systems or components for processing, transmission, data handling, data storage, or other systems, subsystems, modules, add-ons, circuits, processors, or the like. In some embodiments the TPM 116 is for example, a dedicated chip or microcontroller. The TPM 116 may have a non-transitory computer readable memory with software for performing cryptographic processing, including, but not limited to acquiring and storing EKs 110, validating EK lifetimes, and encrypting data with EKs 110. In other embodiments, the TPM 116 is a processor or application specific circuit with circuitry for providing the cryptographic processing. In yet other embodiments, the TPM 116 may be dedicated software that may be run on a general purpose computer and may be run in a protected processor area.

For example, a rotorcraft may have a secured system that handles flight control duties, and may include secured devices such as a navigation system, a communications system, a flight control computer, a flight telemetry system, and the like. Each secured device 114 may communicate over a bus system or other network system that may be exposed to attack by an adversary that may access the network of a downed or captured aircraft. Providing communications between secured devices 114, and between secured devices 116 and external devices 124 permits data security on an effectively untrusted network. Additionally, the use of lifetimes for the certificate 104 and any EKs 110 allows the use of certificates 104 that are associated with a single mission, so that communication for future missions is not compromised by an adversary potentially accessing the certificate 104 or EKs 110 for later use. With EKs 110 expiring when they are past their respective lifetime, an attacker would only be able to use an improperly accessed EK 110 within the EK lifetime, and using lifetimes that are tactically relevant prevents an EK 110 from being used past a useful time. Additionally, the certificate 104, or a top level EK 110 may be tied to a power cycle of the secured system 112, so that the certificate 104 or top level EK 110 expires at the end of a relevant lifetime, or when the secured system 112 is powered off. In some embodiments, a top level EK 110 may be derived when the secured system 112 is powered on or when the certificate 104 is loaded into the secure enclave 106. In some embodiments, the secure enclave 106 may be configured to flush any EKs 110 or the certificate 104 from storage when the secured system 112 is powered down. This may include storing the certificate 104 and EKs 110 in a volatile memory that requires power to maintain, so that when the secured system 112 is powered down or loses power, the volatile memory becomes unpowered and the stored certificate 104 and EKs 110 are lost. In other embodiments, the secure enclave may have a backup or auxiliary power system so that, when the secured system 112 is powered down or loses power, the secure enclave 106 is able to actively erase or otherwise destroy any stored certificate 104 or EKs 110.

In some embodiments, EKs 110 may be derived in the secure enclave 106, and may be distributed to a relevant secured device 114 for storage and used in the respective secured device 114 TPM 116. In some embodiments, EKs may be generated transactionally by the EKMS 108, and sent to the requesting secured device 114 for storage, handling or use in the TPM 116. In some embodiments, information may be exchanged using a temporary key or using a key encryption key 118, or using a signed Diffie-Helman exchange. The EKMS 108 may generate an EK 110 for a secured device 114 according to information sent to the EKMS 108 by the secured device 114. For example, a secured device 114 may send a request message to the EKMS 108, with the request message indicating a data type for which an EK 110 is intended. The request message may also include data indicating a potential parent EK 110, so that the EKMS 108 may tie the validity of a new EK 110 to the validity of the parent EK 110. The EKMS 108 may then validate the secured device 114 according to the temporary key, and verify the validity of the parent EK 110. After validating the secured device 114 and parent EK 110, the EKMS 108 derives the new EK 110 and, in some embodiments, stores data associates with relationships between the new EK 110 and parent EKs 110. The EKMS 108 then sends the new EK 110 to the secured device 114.

The EKs 110 are stored in the TPM 116, and the TPM 116 used the EKs 110 to encrypt or otherwise secure sensitive data 122, which may be any data that needs to be secured, stored, transmitted, processed or otherwise handled with protection from unauthorized access, securing the sensitive data generates secured data 120, which may then be sent to other secured devices, 114 or to external devices 124 outside of the secured system 112.

For example, a radio system may be a secured system 112 and may have a digital signal processor (DSP) and a radio frequency (RF) transceiver that are secured devices 114. The DSP may receive voice data that is treated as sensitive data 122 and process the voice data into a desired data format, which may then be secured by the TPM 116 using EKs 110 to generate secured data 120. The secured data 120 from the DSP may be sent to the RF transceiver, which may validate the secured data using one or more EKs 110, and may process the received data before re-securing the sensitive data using EKs 110 to generate secured data 120 before transmitting the secured data 120 to an external device. Thus, sensitive data 122 may be secured while the sensitive data 122 is sent over, for example, a bus or network, so that the RF transceiver is able to validate the secured data 120, and decrypt the secured data 120 to process the sensitive data 122 before re-encrypting the sensitive data 122 for further transmission.

Each TPM 116 may be a discrete processor, or a portion or a processor, that is dedicated to handling encryption, and in some embodiments, may have secure or dedicated memory for storing EKs 110. In some embodiments, the lifetime or life cycle of the EKs 110 is enforced by the TPM 116. In some embodiments, each EK 110 includes data identifying the particular EK 110. The TPM 116 may also store data related to the lifetime or parent of each EK 110. In other embodiments, the TPM 116 may determine data identifying the lifetime of an EK 110 or a parent EK 110 from data stored in the respective EK 110. The TPM 116 may determine whether an EK 110 is valid based on the lifetime of the EK 110, and based on validity of immediate parent EK, and any other progenitor EKs 110. For example, the TPM 116 may receive a transmission secured using an EK 110 and may determine whether the EK 110 is valid based on the lifetime of the EK 110. Additionally, the TPM 116 may determine a progenitor chain or key chain by determining a first parent EK from parent data associated with the EK 110, and any other progenitor EKs 110, such as a second parent EK 110 that is the parent of the first parent EK 110, a third parent EK 110 that is a parent to the second parent EK 110, and the like. The TPM 116 may determine that each parent EK 110 is valid by being both non-revoked, and having a valid lifetime. Once the TPM 116 determines that the EK 110, any parent EKs 110, and the certificate 104 are valid, the TPM 116 identifies the EK 110 as being valid, and then decrypts the received secured data 120 to access the sensitive data 122.

Figure 1B:
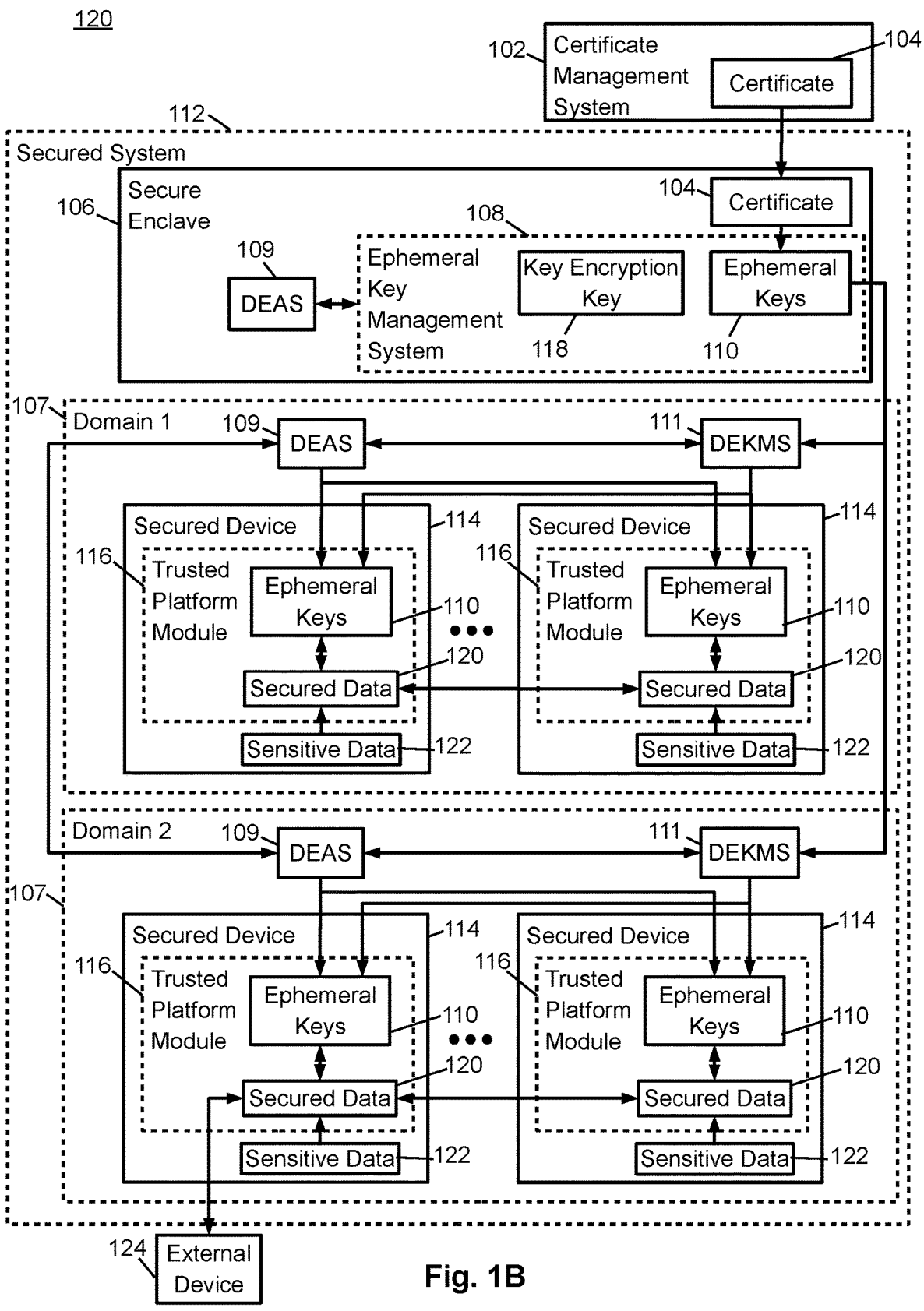

FIG. 1B is a logical diagram illustrating a system 120 for implementing EKs 110 in authentication mains 107 according to some embodiments. The system 120 may be similar to the system of FIG. 1A, any may have one or more domains 107 that share a common set of rules for cryptographic keys. An authentication domain 107, service or system is one where the DEAS is authorized to authenticate users or non-person entities (NPEs). The system 120 may have multiple domains 107, each with one or more secured devices 114.

In some embodiments, the secure enclave 106 itself is temporal, and may generate EKs 110, and may go offline after generating the EKs 110. The secure enclave 106 may have an ephemeral key management system (EKMS) 108 in which one or more ephemeral keys (EKs) 110 are generated, stored or otherwise handled. The secure enclave 106 may also have a distributed ephemeral authentication system 109 (DEAS). Thus, secure enclave 106 may rely on the DEAS 109 or EKMS 108 to track the lifetimes and validity of EKs 110.

Each domain 107 may be a collection of secured devices 114 which share a common set of rules for cryptographic keys or EKs 110, and each domain 107 may have a DEAS 109, and a distributed ephemeral key management system (DEKMS) 111. The DEAS 109 and DEKMS 111 may apply a common set of rules for handling cryptography and cryptopgraphic keys for all of the secured devices 114 of the respective domain 107. The DEAS 109 in each domain 107 may perform authentication of users or EKs 110 for secure devices 14 within the domain 107, and may communicate with other DEASes 109 in other domains 107 or in the secure enclave 106 to perform authentication, request EKs 110, report expiration or termination of EK lifetimes, report invalidation of EKs 110, or the like. Additionally, the DEKMS 111 for each domain 107 may be a system that handles EKs for secure devices 114 within the respective domain 107, and may receive EKs 110 from the secure enclave 106.

In some embodiments, DEASes 109 of different domains 107 may provide authentication for secured devices 114 in the different domains 107 so that EKs in a secured device 114 of a first domain 107 can depend from, and be authenticated against, EKs of a secured device 114 of another domain 107. Thus, DEAS 109 and DEKMS 111 may provide validation of EKs 110 that are dependent on EKs 110 held by other secure devices of the domain 107, or of another domain 107.

In some embodiments, the one or more domains 107 are part of a secured system 112, and each of the secured devices 114 within the respective domain 107 has a respective TPM 116 that communicates with the DEAS 109 and DEKMS 111 to acquire EKs 110, and to validate users, NPEs and EKs 110. Additionally, it should be understood that the secured system 112 is not limited to any particular number of domains 107, or secured devices 114 within a particular domain 107.

In some embodiments, a TPM 116 for a particular secure device 114 may receive an EK 110 from, or receive an EK 110 from, a DEKMS 111 of the domain 107 to which the secure device 114 belongs. Additionally, the TPM 116 or secure device 114 may be validated by the DEAS 109, and any EKs 110 for the TPM 116 or secure device 114 may be validated by the DEAS 109.

Figure 2:
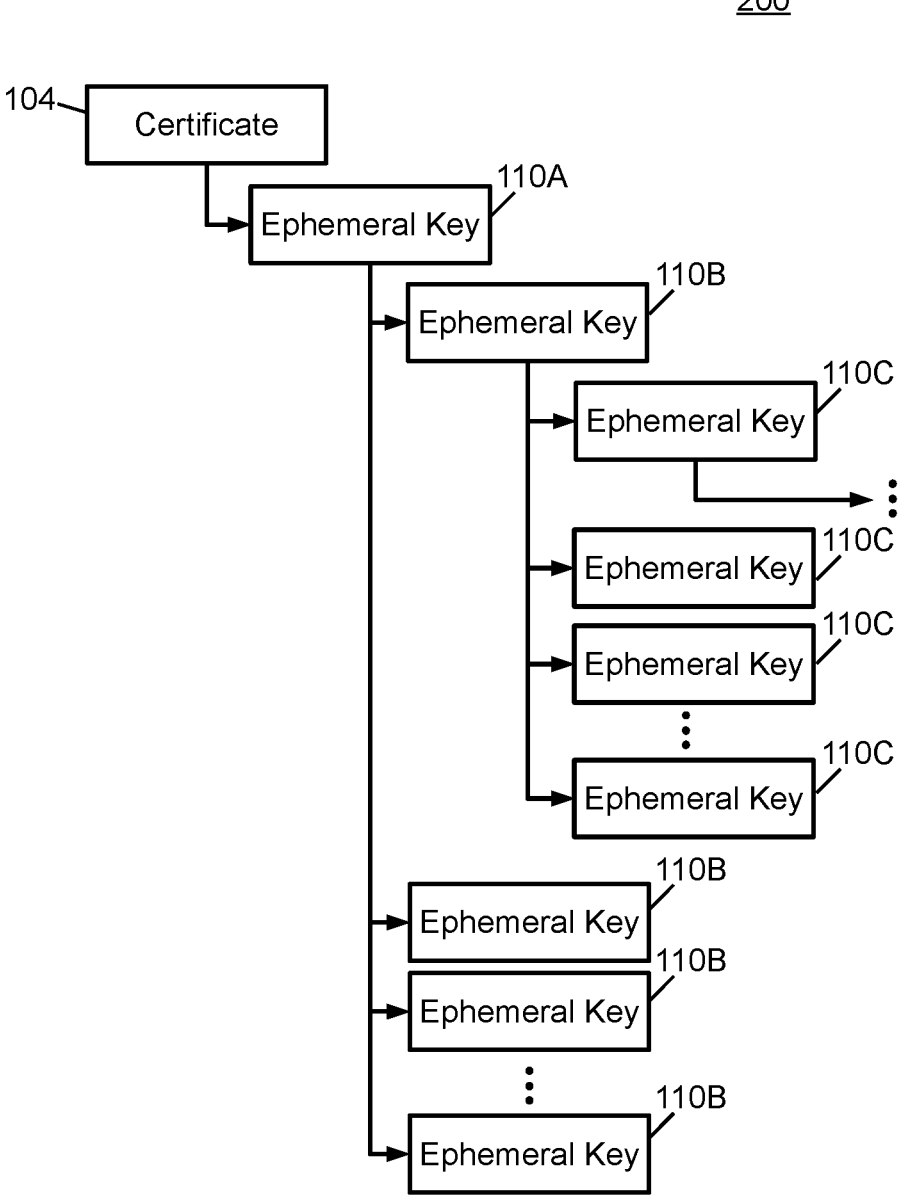
FIG. 2 is a logical diagram illustrating a key chain according to some embodiments.

In some embodiments, EKs 110 may be derived in the secure enclave 106, and may be distributed to a relevant DEKMS 111 of a domain 107 of a target secured device 114 for storage and subsequently provided to the relevant TPM 116 of the target secured deice 114. In some embodiments, EKs 110 may be generated by the EKMS 108, and sent to the requesting DEKMS 111 for a domain 107 for a requesting secured device 114. For example, a secured device 114 may send a request message to the DEKMS 111, which may generate a the request EK,or may pass along the request to validate a newly generated EK 110 with the EKMS 108 in the secure enclave 106. In some embodiments, the EKs 110 are stored in the TPM 116, and validated by the DEAS 109 for the relevant domain 107. FIG. 2 is a logical diagram illustrating a key chain 200 according to some embodiments. The key chain 200 describes a relationship between a certificate 104 and different EKs, and between EKs and any parent and progenitor EKs. The certificate 104 is a parent to a first EK 110A that may, in some embodiments, be a top level key that is a parent key for all other EKs 110B . . . 110C. One or more second EKs 110B may descend from, or depend from, the first EK 110A, so that the first EK is a parent EK for one or more children second EKs 110B. Each second EK 110B may have one or more third EKs 110C that descend from, or depend from, the respective second EK 110B, so a particular second EK 110B is a parent EK for one or more children third EKs, and such that the first EK 110A is a progenitor EK for the third EKs 110C. Thus, each EK may have one or more children EKs, and those children EKs may have children EKs, and so on. This results in the key chain 200 having a tree structure with the certificate 104 as a root for all EKs in the tree, and such that each EK has a parent or progenitor entity. The first EK 110A has the certificate 104 as the progenitor entity, and each other EK has another EK as a parent.

Figure 3:
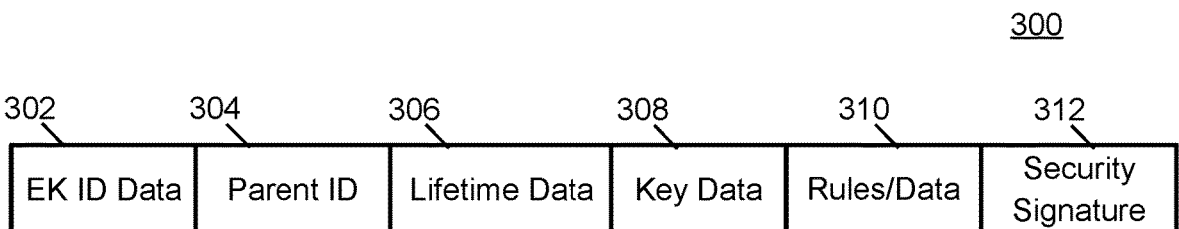
FIG. 3 is a logical diagram illustrating an ephemeral key data structure according to some embodiments.

FIG. 3 is a logical diagram illustrating an ephemeral key data structure 300 according to some embodiments. An EK may have an ephemeral key data structure 300 that identifies the EK and at least data used for encryption. In some embodiments, the EK includes EK identifier (ID) data 302 and key data 308. The key data 308 may be used to, for example, encrypt sensitive data to generate secured data, or to decrypt secured data to access protected data. The EK ID data 302 may be used to identify the specific key and to determine the parent or lifetime of the EK. For example, where the TPM stores lifetime or parent data for a particular EK, the TPM may determine the EK ID of a key, and use the EK ID to determine whether the lifetime for the EK is valid.

Additionally, the TPM may use parent data for the EK to determine the key chain for the EK, identifying each parent in the key chain so that the TPM is able to validate each progenitor EK or parent EK in the key chain.

In some embodiments, a parent ID 304 or other parent data is stored in the EK data structure 300. The parent ID 304 may identify a parent EK permitting the TPM to validate the immediate parent EK, and from the parent EK, identify the remaining EKs in the key chain for validation. Additionally, the EK data structure 300 may also include lifetime data 306 from which a TPM may determine whether a lifetime of the EK is valid or invalid. A valid lifetime is a lifetime where the current time is between a start time and end time of the lifetime. An invalid lifetime indicates that the EK itself is invalid due to the end of the EK lifetime having passed. In some embodiments, the lifetime data 306 may include a lifetime end time, or a lifetime start time or other lifetime data that the TPM may use to determine whether the EK has a valid lifetime. The TPM may, for example, use a lifetime start time, which may be an EK creation time, to determine the lifetime end time according to the data type for the EK.

In some embodiments, the EK data structure 300 may also include rules or data 310 related to the EK. The rules may be related to lifetimes for the EK or child EKs, such as lifetimes for particular data types associated with the EKs. Data for the EK may include, for example, pointers, addresses, or other data related to data being protected by the EK, or may include the data being protected itself, or other relevant data.

Figure 4:
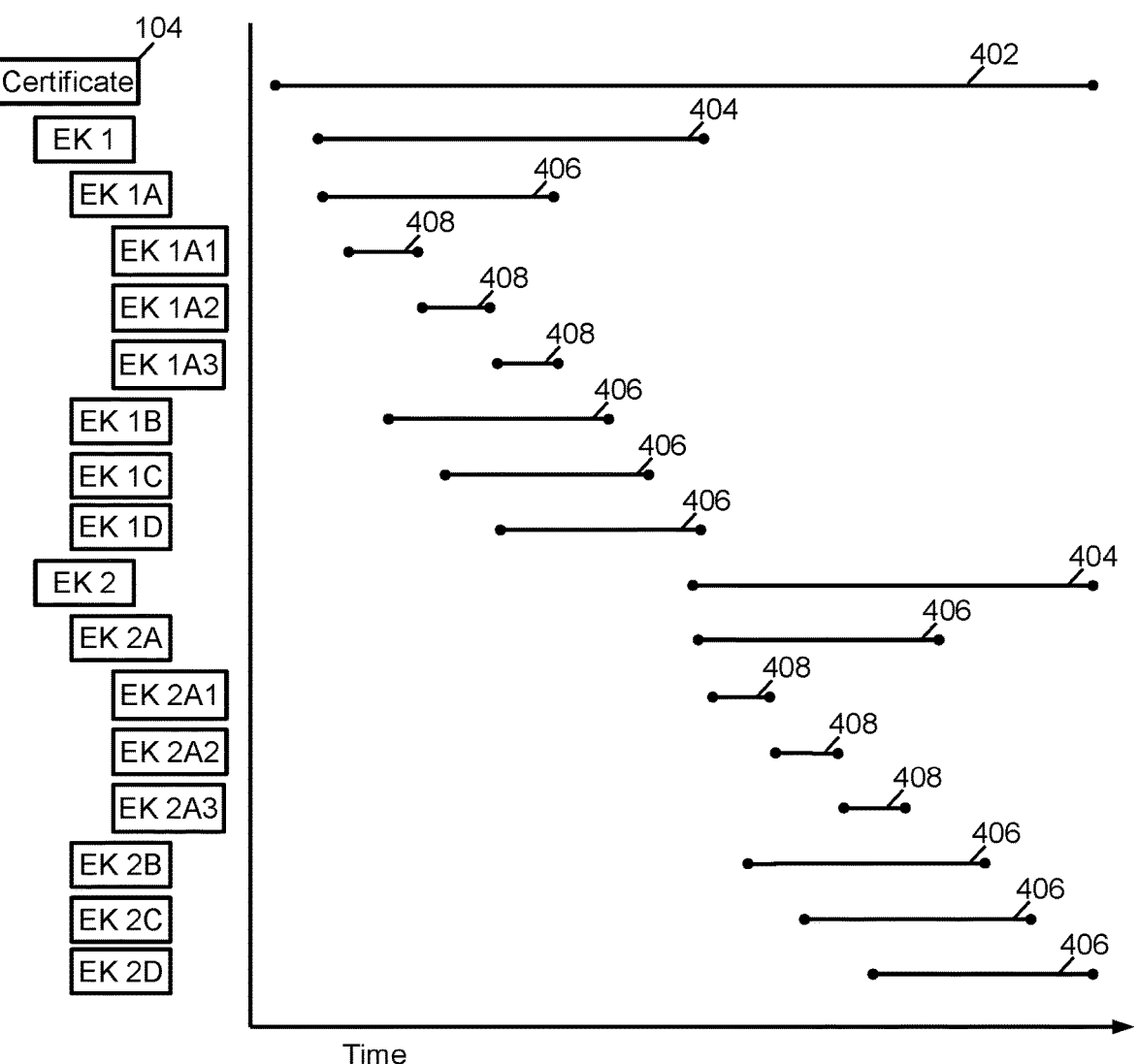
FIG. 4 is a logical diagram illustrating relationships of lifetimes of different EKs according to some embodiments.

FIG. 4 is a logical diagram illustrating relationships of lifetimes 402 . . . 408 of different EKs according to some embodiments. In an example, a certificate 104 may be a top-level security entity with a first lifetime 402. The certificate 104 may have first EKs EK 1, EK 2 as children, and each of the first EKs EK 1, EK 2 may have second lifetimes 404, with each of the second lifetimes 404 being shorter than the first lifetime 402 of the certificate. Notably, the second lifetimes 404 start after, or at the same time, the first lifetime 402 starts, and end before, or at the same time, that the first lifetime 402 ends. Additionally, while the first EKs EK 1 and EK 2 are shown as having a same second lifetime 404, children with the same parent may be have different data types, and different lifetimes, or may be the same data type, and have different lifetimes due to the criticality of the data being protected by the respective EKs.

Each first EK EK 1, EK 2 may have one or more children second EKs EK 1A. . . . EK 1D, EK 2A. . . . EK 2D, and each second EK EK 1A. . . . EK 1D, EK 2A. . . . EK 2D has an associated third lifetime 406 that is effective or valid during the second lifetime 404 of the respective parent first EK EK 1, EK 2. Similarly, each second EK EK 1A. . . . EK 1D may have one or more children third EKs EK 1A1-EK 1A3, and each third EK EK 1A1-EK 1A3 has an associated fourth lifetime 408 that is effective during the third lifetime 406 of the respective parent second EK EK 1A. . . . EK 1D. Notably, the lifetimes of EKs that have a same parent may not necessarily be related, and may overlap or be non-overlapping.

Figure 5:
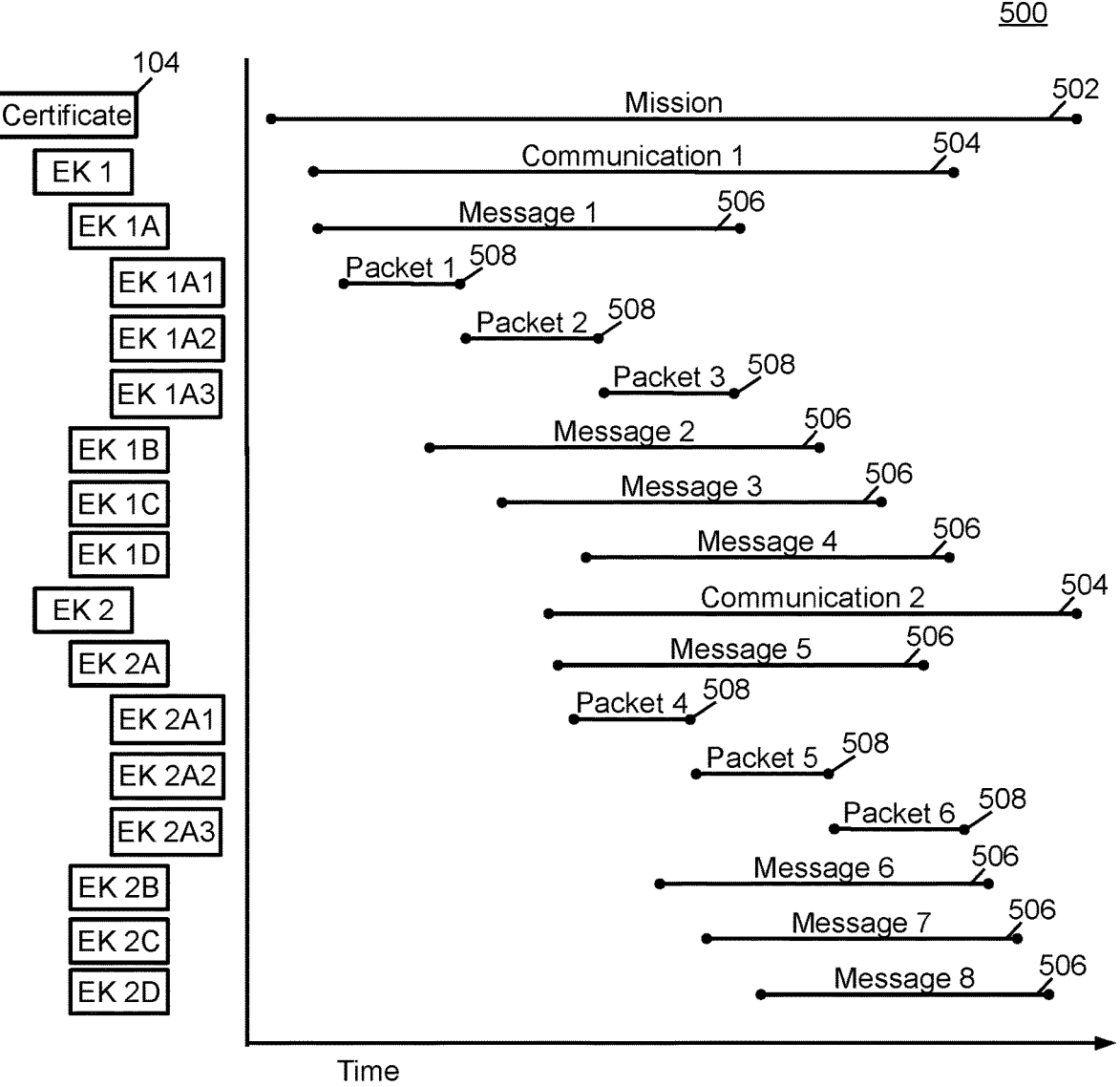
FIG. 5 is a logical diagram illustrating an arrangement of EK lifetimes associated with different data types.

FIG. 5 is a logical diagram illustrating an arrangement 500 of EK lifetimes associated with different data types. The arrangement of EK lifetimes illustrates an example of a potential set of EKs for transmission of communication data. The certificate 104 may have an associated mission lifetime 502 that is set to run during, for example a power-on period of a device, system, vehicle, or the like, and may have an end time that is set according to the anticipated end time of a particular mission, or is set to end when the relevant device, system, vehicle, or the like is powered off. The certificate 104 may be provided to a system prior to power up, or while the system is powered up. The system may be any system that stores or processes data, or that communicates with another entity, and needs to protect sensitive data. Transmissions between systems may include any type of bus or network protocol, and the securing of transmissions may be performed using, for example, a network transport layer, a session layer, a presentation layer, an application layer, or another layer or type of hardware or software, depending on the system requirements.

An initial EK EK 1 may be derived for a first communication, such as a connection for transmission of data by the system to another system. The data type associated with the first EK EK 1 may be identified to, for example, the ephemeral key management system (EKMS) as a communication, and the EKMS may assign a communications lifetime 504 to the first EK EK 1. Thus, the system may request a new EK from the EKMS when preparing to set up the first communication, and may include an identification of the data type in the request. The TPM may then generate the EK from the certificate 104, or from another EK that will be a parent EK for the first EK EK 1. The system receives the first EK EK 1 and for example, sets up a connection or starts a communication with the other system by encrypting the relevant sensitive data using the first EK EK 1. Thus, where the data type is the first communication, the first EK EK 1 may be used to secure sensitive data such as identification data of the system, connection data and settings for the first communication, higher level passwords or authentication data, or the like. In other embodiments, the first communication may not require interaction between the system and another system to set up, but an EK may be associated with the communication in order to provide a communication lifetime 504 under which messages and packets may be sent.

The first communication may include transmission of one or more messages, and when a first message related to the first communication needs to be sent, the system acquires a second EK EK 1A that is associated with the first EK EK 1. The second EK EK 1A may have a message lifetime 506 that is associated with the communications lifetime. Thus, the first message is part of, or a child of, the first communication with the first EK EK 1 and the first message has the second EK EK 1A that is a child of, or otherwise dependent from, is associated with, or is otherwise related to, the first EK EK 1 of the first communication. In some embodiments, the second EK EK 1A may be acquired from the EKMS by sending a request to the EKMS indicating the parent entity EK. For the first message, the parent entity EK would be the parent EK EK 1. The EKMS may generate and return the EK EK 1A for the message, and the TPM may save the second EK EK 1A.

Additionally, transmission of the first message with the second EK EK1A may include transmission of multiple packets. When each packet is sent, the system may acquire a third EK EK 1A1-EK 1A3 for the new packet, and each third EK EK 1A1-EK 1A3 may have a packet lifetime 508, with each packet lifetime 508 being different from, or the same as, each other packet lifetime 508. Thus, each packet for the first message with the second EK EK 1A has a third EK EK 1A1-EK 1A3 that is associated with the second EK EK 1A of the first message, and is indirectly associated with the first EK EK 1 of the first communication since the first EK EK 1 is in the key chain for each packet and each third EK EK 1A1-EK 1A3.

The packets may further have sub-elements that need their own EKs, such as for retransmissions, acknowledgements, or the like. The number and logical structure of elements is not limited in scope, as each element or sub-element may have their own sub-elements that require EK, with the EKs spending from parent EKs and having lifetimes associated with lifetimes of the parent EKs.

The system may also have additional communications that have separate EKs EK 2 with associated communications lifetimes 504, and their own messages with separate EKs EK 2A-EK 2D. Each of the messages may further have separate packets with separate EKs EK 2A1-EK 2A3 and packet lifetimes 508.

Figure 6:
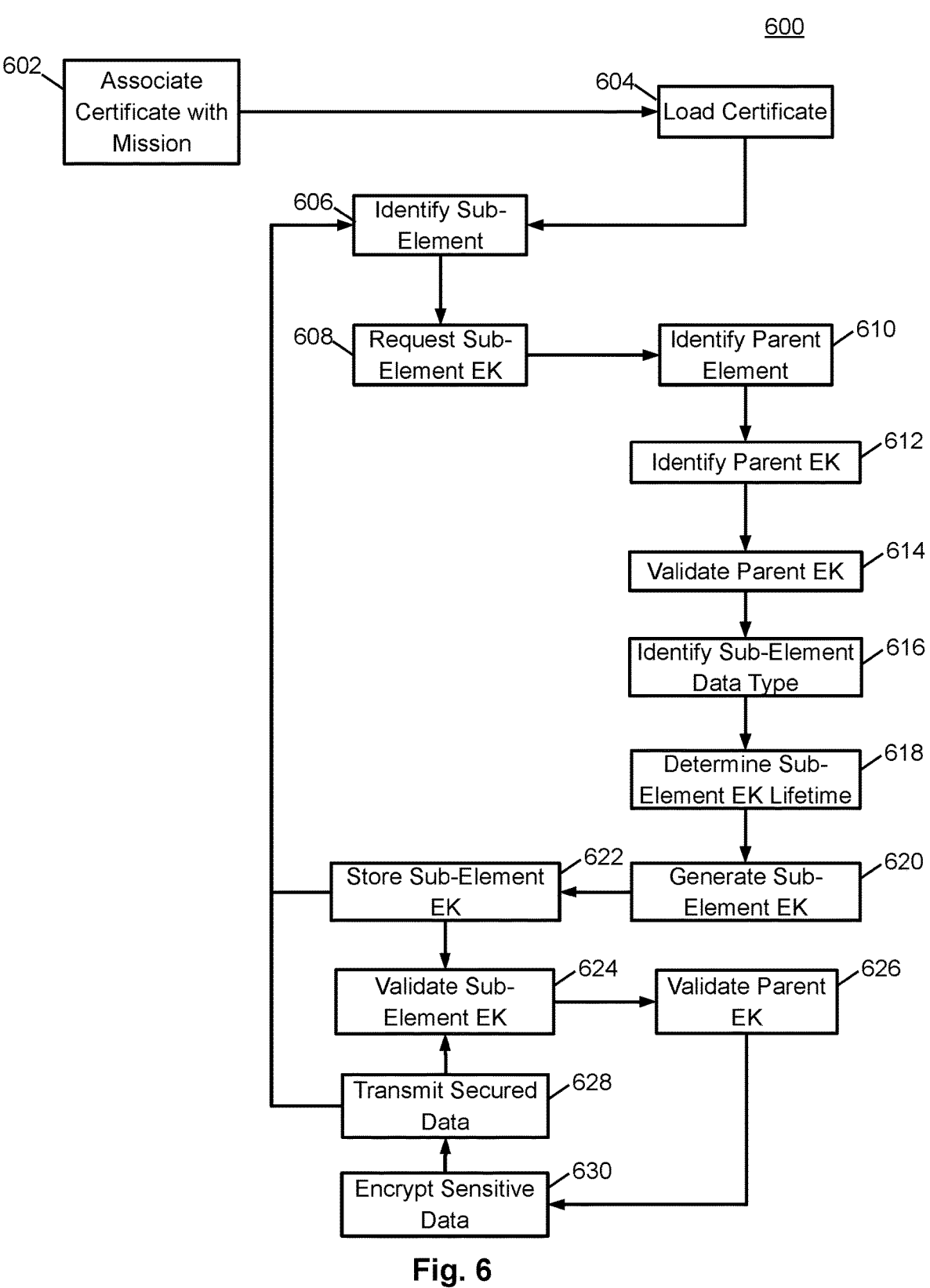
FIG. 6 is a flow diagram illustrating a method for implementing EKs according to some embodiments.

FIG. 6 is a flow diagram illustrating a method 600 for implementing EKs according to some embodiments. The method 600 includes, in block 602, associating a certificate with a mission. In some embodiments, a certificate management system generates a certificate to be used on a particular mission. The certificate may be assigned a certificate lifetime that is relevant to anticipated lifetime of the planned mission, or that is related to the criticality of the mission. In block 604, the certificate is loaded into a system associated with the mission. In some embodiments, the certificate may be loaded into a secure enclave in a secured system that may be subject to attempted adversary access. The secure enclave may be a secure processor or memory that maintains the certificate, while, for example, the secure system is powered on, and permits the erasure of the certificate when the secured system powers off, or the certificate lifetime expires.

In block 606, a sub-element is identified. The identified sub-element is a data element that needs an EK. The sub-element may be a top-level element, for example, an initial element without a parent element, but that is associated with the mission. The sub-element may also be a data element that is associated with, or a child of, a top-level element, or another sub-element. In block 608, a sub-element EK is requested. In some embodiments, the sub-element EK may be a top-level EK that is directly derived from the certificate, or may be a child EK that is a child of a parent EK. In block 610, the parent element is identified. The parent element is an element from which the sub-element descends or dependents, resulting in the sub-element being a child of the parent element. In some embodiments, the parent element is the certificate, resulting in the sub-element being a top-level element. In other embodiments, the parent element is another sub-element that directly or indirectly depends or descends from the certificate.

In block 612, the parent EK is identified, and the parent EK may be an EK associated with a parent element. In some embodiments, the parent EK may be identified based on an association between the parent element and the parent EK. In other embodiments, the parent EK may be identified directly in the request for the sub-element EK (Block 608).

In block 614, the parent EK is validated. In some embodiments, a TPM may validate the parent EK, and in other embodiments, the EKMS may validate the parent EK. Validating the parent EK may, for example, include validating the lifetime of the parent EK, and that the parent EK has not been revoked or cancelled, through another process. Additionally, the key chain for the parent EK may be validated, including validating the lifetimes and other validity of parent EKs or other progenitor EKs.

In block 616, the data type of the sub-element is identified. In some embodiments, the request for the sub-element (608) EK may include an identification of the data type, and the TPM or EKMS may also check that the sub-element data type properly requests to be a child of the parent. For example, the TPM or EKMS may verify that, if the data type for the requested sub-element EK is a packet, that the parent has a valid data type, such as a message, to be a parent for the packet sub-element.

In block 618, the lifetime for the sub-element EK is determined. In some embodiments, the lifetime for the sub-element may be determined according to the data type of the sub-element, and may further be a determined according to the criticality of the data in the sub-element. For example, an EK may have a base lifetime, which may be adjusted by lengthening or shortening the lifetime for more or less critical data. This permits highly critical data to be more tightly controlled than less critical data, and allowing greater flexibility for less critical data.

Certain critical data may generate a relationship with another independent EK chain. This relationship acts an additional control method which requires both EKs to access the critical data. This data, for example, could be a command to a cyberphysical effector controlling a vehicle. Using a relationship between critical data and another independent EK chain protects against spoofing of an EK that controls critical data. Data can be critical because of the nature of its action in the system, or by its security properties. For example, the EKMS may generate a relational EK pair of EKs which are sent to the secured devices to tightly couple critical operations between the pair. The EK effective lifetime can also be terminated if the data is no longer required or deleted, after which the system also terminates the EK.

In block 620, the sub-element EK is generated, created or otherwise created. The new EK may be associated with or linked to the parent EK, and the sub-element may be associated with the parent element. Thus, a relationship between identifiers for the sub-element and the parent element may be stored, for example, by the TPM or the EKMS. Alternatively, a relationship between the parent element EK and the sub-element EK may be stored, for example, by the TPM or the EKMS. In some embodiments, an identifier of a parent element or a parent EK may be stored in, or with, the EK to identify the relationship between the EK and the parent EK or parent element.

In block 622, the sub-element EK is stored. In some embodiments, the TPM stores the sub-element EK in, for example, protected memory or protected processor space. The TPM may received a generated sub-element EK from the EKMS, with the sub-element EK encrypted using a key encryption key or other secure transmission system, and may store the sub-element EK. In some the EKs may be distributed using a signed Diffie-Helman exchange, or an authenticated key exchange to create trust between entities when subjected to an untrusted channel or network on which an adversary might access message The sub-element EK may include, or may be transmitted with, relevant lifetime data, which may be saved by the TPM. In some embodiments, the sub-element EK may be stored without the sub-element EK being used immediately, and a process of acquiring a sub-element EK may be repeated by identifying a new sub-element in block 606, and the repeating the rest of the process.

When a sub-element EK is needed to encrypt sensitive data, the sub-element EK may be validated in block 624. Validating the sub-element EK may include, in some embodiments, determining that the lifetime of the sub-element EK is valid, namely, that the lifetime of the sub-element EK is valid or otherwise not expired. Additionally, the sub-element EK may be validated by determining whether the sub-element EK has been revoked or cancelled.

In block 626, the parent EK may be validated. In some embodiments, validating the parent EK may be part of validating the sub-element EK. The TPM may validate the parent if the parent is stored on the TPM, with the TPM ensuring that the parent EK, and any other progenitor EKs in the key chain, have valid lifetimes and are not revoked or otherwise not usable.

Once the parent EK and sub-element EKs have been validated, the sensitive data of interest may be encrypted with the sub-element EK. The secured data may then be transmitted, stored, or otherwise used in block 628. After transmitting the secured data, the process may be repeated by again validating the sub-element EK in block 624 to re-verify the validity of the sub-element EK if the sub-element EK need to be reused.

An embodiment system includes a secure enclave configured to generate one or more ephemeral keys (EKs), where each EK of the one or more EKs has a lifetime associated with the respective EK, and one or more secured devices connected to the secure enclave, where each secured device of the one or more secured devices has a trusted platform module (TPM) configured to acquire at least one of the one or more EKs, where the TPM of each secured device further is configured to generate secured data in response to validating the lifetime of an associated EK by encrypting sensitive data with the associated EK, and where each secured device of the one or more secured devices is further configured to transmit the secured data to an entity external to the secured device.

In some embodiments, the TPM of each secured device is further configured to validate the lifetime of the associated EK by determining whether the lifetime of the associated EK is a valid lifetime where the lifetime has not expired. In some embodiments, the TPM of each secured device is further configured to determine one or more parent EKs of the associated EK in a key chain for the associated EK, and to validate the lifetime of the associated EK by determining whether lifetimes of the one or more parent EKs are valid lifetimes where the respective lifetimes have not expired. In some embodiments, each secured device of the one or more secured devices is further configured to request the associated EK, where requesting the associated EK includes identifying a data type of the sensitive data. In some embodiments, the lifetime of the associated EK is associated with the data type of the sensitive data. In some embodiments, the lifetime of the associated EK is associated with at least a lifetime of a parent EK from which the associated EK directly descends. In some embodiments, the lifetime of the associated EK is shorter than at least a lifetime of the parent EK, and an end time of the lifetime of the associated EK is before, or the same as, an end time of the lifetime of the parent EK.

An embodiment system includes a processor, and a non-transitory computer readable medium having a program stored thereon for implementing a trusted platform module (TPM). The program includes instructions to acquire, from a secure enclave, at least one ephemeral key (EK) of one or more EKs generated by the secure enclave, where each EK of the one or more EKs has a lifetime associated with the respective EK, generate secured data in response to validating the lifetime of an associated EK by encrypting sensitive data with the associated EK, and transmit the secured data to an entity external to the system.

In some embodiments, the program further includes instructions to validate the lifetime of the associated EK by determining whether the lifetime of the associated EK is a valid lifetime where the lifetime has not expired. In some embodiments, the program further includes instructions to determine one or more parent EKs of the associated EK in a key chain for the associated EK, and validate the lifetime of the associated EK by determining whether lifetimes of the one or more parent EKs are valid lifetimes where the respective lifetimes have not expired. In some embodiments, the program further includes instructions to request the associated EK from the secure enclave, where requesting the associated EK includes identifying a data type of the sensitive data. In some embodiments, the lifetime of the associated EK is associated with the data type of the sensitive data. In some embodiments, the lifetime of the associated EK is associated with at least a lifetime of a parent EK from which the associated EK directly descends. In some embodiments, the lifetime of the associated EK is shorter than at least a lifetime of the parent EK, and wherein an end time of the lifetime of the associated EK is before, or the same as, an end time of the lifetime of the parent EK.

An embodiment method includes generating one or more ephemeral keys (EKs), wherein each EK of the one or more EKs has a lifetime associated with the respective EK, acquiring, by a trusted platform module (TPM) of a secure device of one or more secured devices, at least one EK of the one or more EKs, generating, by the TPM, secured data in response to validating the lifetime of an associated EK by encrypting sensitive data with the associated EK, and transmitting, by the TPM, the secured data to an entity external to the secured device.

In some embodiments, the method further includes validating, by the TPM, the lifetime of the associated EK by determining whether the lifetime of the associated EK is a valid lifetime where the lifetime has not expired. In some embodiments, the method further includes determining one or more parent EKs of the associated EK in a key chain for the associated EK, and validating the lifetime of the associated EK by determining whether lifetimes of the one or more parent EKs are valid lifetimes where the respective lifetimes have not expired. In some embodiments, the method further includes requesting the associated EK from, wherein requesting the associated EK includes identifying a data type of the sensitive data. In some embodiments, the lifetime of the associated EK is associated with the data type of the sensitive data, and the lifetime of the associated EK is associated with at least a lifetime of a parent EK from which the associated EK directly descends. In some embodiments, the lifetime of the associated EK is shorter than at least a lifetime of the parent EK, and an end time of the lifetime of the associated EK is before, or the same as, an end time of the lifetime of the parent EK.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
a secure enclave implemented in hardware and configured to generate one or more ephemeral keys (EKs), wherein each EK of the one or more EKs has a lifetime associated with the respective EK, wherein the lifetime of an associated EK is associated with a data type of sensitive data associated with the EK and is further associated with a criticality of the sensitive data, wherein the lifetime of the associated EK is further associated with at least a lifetime of a parent EK from which the associated EK directly descends, and wherein the lifetime of the associated EK is set by adjusting a base lifetime of the associated EK based on the criticality of the sensitive data; and
one or more secured devices connected to the secure enclave, wherein each secured device of the one or more secured devices has a trusted platform module (TPM) configured to acquire at least one of the one or more EKs, wherein the TPM of each secured device is further configured to generate secured data in response to validating the lifetime of the associated EK by encrypting the sensitive data with the associated EK, wherein the lifetime of the associated EK is identified by lifetime data disposed in a data structure of the associated EK and from which the TPM determines whether the lifetime of the associated EK is valid or invalid, and wherein each secured device of the one or more secured devices is further configured to transmit the secured data to an entity external to the secured device.

2. The system of claim 1, wherein the TPM of each secured device is further configured to validate the lifetime of the associated EK by determining whether the lifetime of the associated EK is a valid lifetime where the lifetime has not expired.

3. The system of claim 1, wherein the TPM of each secured device is further configured to determine, according to identification data disposed in the associated EK for the parent EK, one or more parent EKs of the associated EK in a key chain for the associated EK, and to validate the lifetime of the associated EK according to the lifetime data for the associated EK disposed in the data structure of the associated EK and by determining whether lifetimes of the one or more parent EKs are valid lifetimes where the respective lifetimes have not expired.

4. The system of claim 1, wherein each secured device of the one or more secured devices is further configured to request the associated EK, wherein requesting the associated EK includes identifying the data type of the sensitive data.

5. The system of claim 1, wherein the lifetime of the associated EK is shorter than at least the lifetime of the parent EK, and wherein an end time of the lifetime of the associated EK is before, or the same as, an end time of the lifetime of the parent EK.

6. A system, comprising:
a processor; and
a non-transitory computer readable medium having a program stored thereon for implementing a trusted platform module (TPM), the program including instructions to:
acquire, from a secure enclave, at least one ephemeral key (EK) of one or more EKs generated by the secure enclave, wherein each EK of the one or more EKs has a lifetime associated with the respective EK, wherein the lifetime of an associated EK is associated with a data type of sensitive data associated with the EK and is further associated with a criticality of the sensitive data, wherein the lifetime of the associated EK is further associated with at least a lifetime of a parent EK from which the associated EK directly descends, and wherein the lifetime of the associated EK is set by adjusting a base lifetime of the associated EK based on the criticality of the sensitive data;
generate secured data in response to validating the lifetime of the associated EK by encrypting the sensitive data with the associated EK, wherein the lifetime of the associated EK is identified by lifetime data disposed in a data structure of the associated EK and from which the TPM determines whether the lifetime of the associated EK is valid or invalid; and transmit the secured data to an entity externalto the system.

7. The system of claim 6, wherein the program further includes instructions to validate the lifetime of the associated EK by determining whether the lifetime of the associated EK is a valid lifetime where the lifetime has not expired.

8. The system of claim 6, wherein the program further includes instructions to:

determine one or more parent EKs of the associated EK in a key chain for the associated EK according to identification data disposed in the associated EK for the parent EK; and validate the lifetime of the associated EK according to the lifetime data for the associated EK disposed in the data structure of the associated EK and by determining whether lifetimes of the one or more parent EKs are valid lifetimes where the respective lifetimes have not expired.

9. The system of claim 6, wherein the program further includes instructions to request the associated EK, wherein requesting the associated EK includes identifying the data type of the sensitive data.

10. The system of claim 9, wherein the lifetime of the associated EK is shorter than at least the lifetime of the parent EK, and wherein an end time of the lifetime of the associated EK is before, or the same as, an end time of the lifetime of the parent EK.

11. A method, comprising:

generating one or more ephemeral keys (EKs), wherein each EK of the one or more EKs has a lifetime associated with the respective EK, wherein the lifetime of an associated EK is associated with a data type of sensitive data associated with the EK and is further associated with a criticality of the sensitive data, wherein the lifetime of the associated EK is further associated with at least a lifetime of a parent EK from which the associated EK directly descends, and wherein the lifetime of the associated EK is set by adjusting a base lifetime of the associated EK based on the criticality of the sensitive data;

acquiring, by a trusted platform module (TPM) of a secure device of one or more secured devices, at least one EK of the one or more EKs;

generating, by the TPM, secured data in response to validating the lifetime of the associated EK by encrypting the sensitive data with the associated EK, wherein the lifetime of the associated EK is identified by lifetime data disposed in a data structure of the associated EK and from which the TPM determines whether the lifetime of the associated EK is valid or invalid; and transmitting, by the TPM, the secured data to an entity externalto the secured device.

12. The method of claim 11, further comprising validating, by the TPM, the lifetime of the associated EK by determining whether the lifetime of the associated EK is a valid lifetime where the lifetime has not expired.

13. The method of claim 11, further comprising:

determining one or more parent EKs of the associated EK in a key chain for the associated EK according to identification data disposed in the associated EK for the parent EK; and validating the lifetime of the associated EK according to the lifetime data for the associated EK disposed in the data structure of the associated EK and by determining whether lifetimes of the one or more parent EKs are valid lifetimes where the respective lifetimes have not expired.

14. The method of claim 11, further comprising requesting the associated EK, wherein requesting the associated EK includes identifying the data type of the sensitive data.

15. The method of claim 14, wherein the lifetime of the associated EK is shorter than at least the lifetime of the parent EK, and wherein an end time of the lifetime of the associated EK is before, or the same as, an end time of the lifetime of the parent EK.

16. The system of claim 1, wherein the base lifetime of the associated EK is set according to the data type of the sensitive data and the lifetime of the parent EK from which the associated EK directly descends.

17. The system of claim 16, wherein a second EK of the one or more EKs directly descends from the same parent EK from which the associated EK directly descends, wherein the second EK has at least one of a different data type or a different criticality of the associated sensitive data, and wherein the second EK has a second lifetime that is different from the lifetime of the associated EK.

18. The system of claim 6, wherein the base lifetime of the associated EK is set according to the data type of the sensitive data and the lifetime of the parent EK from which the associated EK directly descends.

19. The system of claim 18, wherein a second EK of the one or more EKs directly descends from the same parent EK from which the associated EK directly descends, wherein the second EK has at least one of a different data type or a different criticality of the associated sensitive data, and wherein the second EK has a second lifetime that is different from the lifetime of the associated EK.

20. The method of claim 11, wherein the base lifetime of the associated EK is set according to the data type of the sensitive data and the lifetime of the parent EK from which the associated EK directly descends.

* * * * *